(12) United States Patent
Adler et al.

(10) Patent No.: US 8,407,407 B1
(45) Date of Patent: Mar. 26, 2013

(54) SOLID STATE DRIVE ACCESS CONTROL SYSTEM WITH EQUALIZED ACCESS TIMING

(75) Inventors: Jason Adler, Fremont, CA (US); Lau Nguyen, Sunnyvale, CA (US); Perry Neos, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 369 days.

(21) Appl. No.: 12/883,430

(22) Filed: Sep. 16, 2010

Related U.S. Application Data

(60) Provisional application No. 61/248,984, filed on Oct. 6, 2009.

(51) Int. Cl.
*G06F 13/12* (2006.01)

(52) U.S. Cl. .. 711/103; 711/157; 711/158; 711/E12.078

(58) Field of Classification Search .................. 711/157, 711/103, 158

See application file for complete search history.

(56) References Cited

U.S. PATENT DOCUMENTS

2009/0172257 A1 * 7/2009 Prins et al. .................... 711/103
2009/0172499 A1 * 7/2009 Olbrich et al. ................ 714/773

* cited by examiner

*Primary Examiner* — Kenneth Lo

(57) ABSTRACT

A drive control module of a solid-state drive (SSD) includes a first module that receives host commands from one of a host command buffer and a drive interface of the SSD, converts the host commands to stage commands, and determines whether to store the stage commands in a stage slot of a staging memory or leave the stage slot empty. A second module transfers data between a buffer and a flash memory based on the stage commands. The flash memory comprises flash arrays. A third module detects a first empty stage of one of the flash arrays and based on an empty stage timer value triggers at least one of an end of the first empty stage, a start of an at least partially full stage of the one of the flash arrays, or a start of a second empty stage of the one of the flash arrays.

20 Claims, 10 Drawing Sheets

SOLID STATE DRIVE ACCESS CONTROL SYSTEM WITH EQUALIZED ACCESS TIMING

CROSS-REFERENCE TO RELATED APPLICATIONS

This application claims the benefit of U.S. Provisional Application No. 61/248,984, filed on Oct. 6, 2009. The disclosure of the above application is incorporated herein by reference in its entirety.

FIELD

The present disclosure relates to solid state drive access control systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A solid-state drive (SSD) is a data storage device that stores data in a solid-state memory, such as a NAND flash memory. A solid-state drive (SSD) typically includes a drive interface, a buffer, a control module and solid-state memory. During a write operation, the drive interface receives data from a host interface of a host (e.g., a computer). The data is initially stored in the buffer and then transferred to the solid-state memory based on a write command.

A data "bottleneck" can occur at the solid-state memory due to differences between program times or storage rates of solid-state memory and transmission rates of the host. Storage rates of solid-state memory can be slower than transmission rates of a host. The transmission rates of a host vary and in general can not be directly adjusted by a control module of a SSD. Also, a control module of a SSD is not informed of the transmission rates of the host.

In addition, the storage rates of a solid-state memory vary and in general can not be directly adjusted by a control module of a SSD. Solid state memory of different types and of the same type can have different storage rates. Memory devices (e.g., memory chips) of the same solid-state memory can also have different storage rates. Variance in storage rates can be due to age and usage of solid-state devices.

The inability of the control module to directly control transmission rates of the host and the storage rates of the solid-state memory limits the ability of the control module to improve writing and/or access efficiency. The control module may, for example, stop accessing data from the host and/or signal the host to stop sending data to the SSD when the buffer is full. Although this indirectly regulates output of the host, overall storage times are increased. Thus, data transfer efficiency between the host and the solid-state memory can be limited.

SUMMARY

A drive control module of a solid-state drive (SSD) is provided and includes first, second and third modules. The first module is configured to receive host commands from one of a host command buffer and a drive interface of the SSD, convert the host commands to stage commands, and determine whether to store the stage commands in a stage slot of a staging memory or leave the stage slot empty. The second module is configured to transfer data between a buffer and a flash memory of a flash memory module based on the stage commands. The flash memory comprises flash arrays. The third module is configured to detect a first empty stage of one of the flash arrays and based on an empty stage timer value to trigger at least one of an end of the first empty stage, a start of an at least partially full stage of the one of the flash arrays, or a start of a second empty stage of the one of the flash arrays.

In other features, the first module selectively stores the stage commands in the stage slot of the staging memory based on a stage complete signal received from the flash memory module or generated by the second module.

In other features, the first module selectively stores the stage commands in the stage slot of the staging memory based on an empty stage time out signal. In other features, the third module triggers storing of stage commands in the staging memory for the at least partially full stage when triggering the start of the at least partially full stage.

In other features, the third module includes a first timer, a second timer, a fourth module and a fifth module. The first timer is configured to determine at least one of an average stage period or a location-based period. The second timer is configured to determine an empty stage period. The fourth module is configured to compare the empty stage period to the at least one of an average stage period or the location-based period and to generate a comparison signal. The fifth module is configured to, based on the comparison signal, trigger the at least one of the end of the first empty stage, the start of the at least partially full stage, or the start of a second empty stage.

In other features, the third module includes a first timer, a second timer, and a fifth module. The first timer is configured to determine at least one of an average stage period or a location-based period. The second timer is configured to count down from the at least one of the average stage period or the location-based period. The fifth module is configured to, when an empty stage timer value of the second timer decrements to 0, trigger the at least one of the end of the first empty stage, the start of the at least partially full stage, or the start of the second empty stage.

In other features, the first module stores stage commands in the staging memory based on the end of an empty stage trigger when an empty stage is detected. The first module stores stage commands in the staging memory based on a complete signal when an empty stage is not detected.

In other features, the third module is configured to detect the first empty stage of the one of the flash arrays and trigger the end of the first empty stage and trigger either the start of an at least partially full stage or the start of the second empty stage.

In other features, a system includes the buffer, the drive control module, and a flash memory module comprising the flash memory. In other features, the system further includes the host with a host interface. The host interface communicates with the drive interface. The host interface and the drive interface are one of serial advanced technology attachment (SATA) interfaces and small computer system interfaces (SCSIs).

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
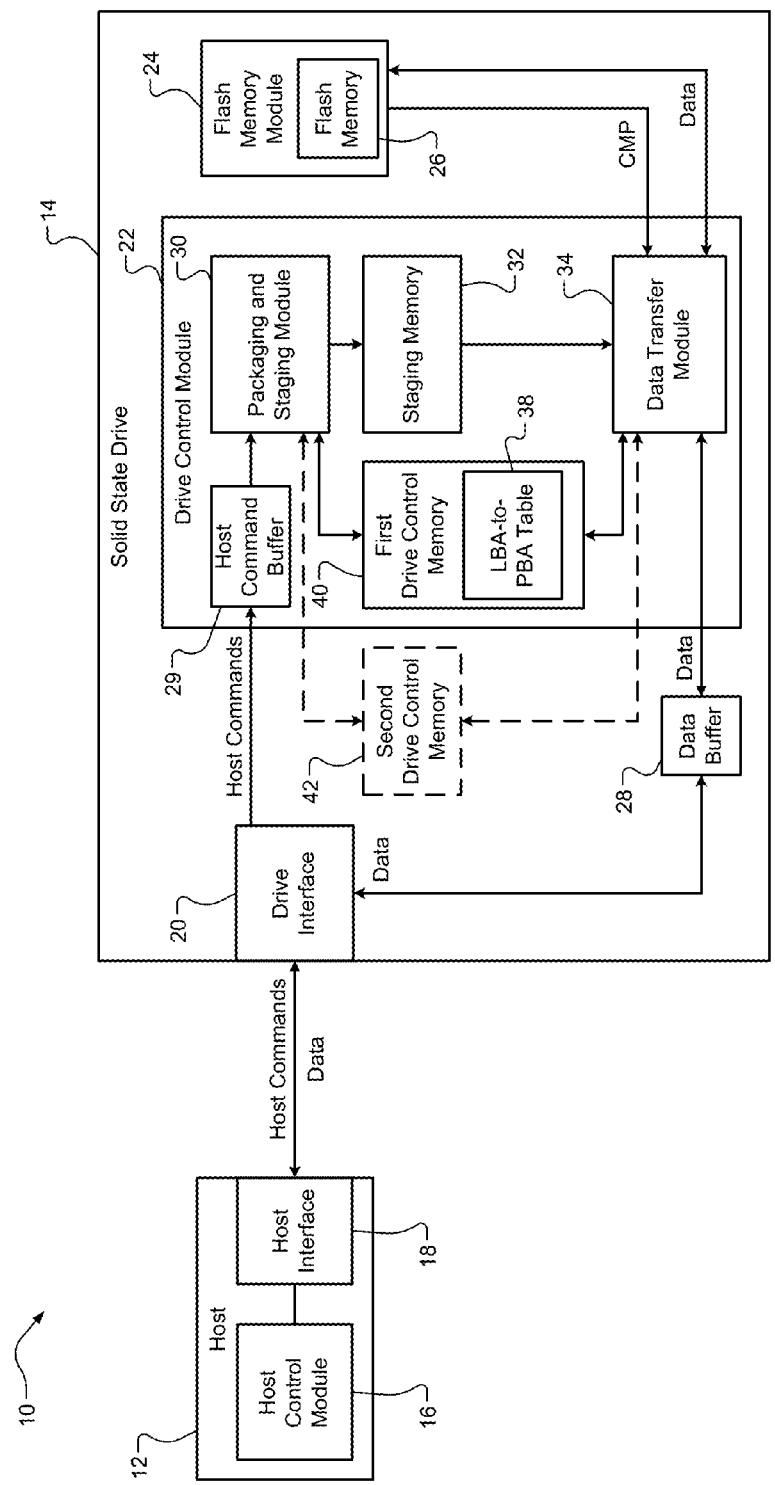
FIG. 1 is a functional block diagram of a storage system in accordance with the present disclosure.

The following description is merely illustrative in nature and is in no way intended to limit the disclosure, its application, or uses. For purposes of clarity, same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or grouped) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A solid-state drive (SSD) may include flash arrays. A flash array includes an array of memory integrated circuits (ICs) (or memory chips). The flash arrays may be accessed in parallel to reduce effects of a bottleneck between a host and the SSD. Access efficiency of the arrays is maximized when the flash arrays are constantly busy with no delays between data transfers. The following disclosure provides systems and methods to improve access efficiency for random and/or "bursty accesses".

A random access is performed based on random host commands. A random host command refers to host requests to access non-sequential locations of flash memory in a SSD. Random host commands are reordered for improved parallel access to flash arrays of the SSD.

Bursty accesses refer to accesses that are provided over non-uniform periods and include varying amounts of host commands. For example, a host may provide: a first portion of host commands to a SSD at a first rate; stop providing host commands for a period of time; and then provide a second portion of host commands to the SSD at a second rate. The first rate may be different than the second rate.

Systems and methods of the following disclosure convert commands of bursty accesses to regulated stage commands to provide constant access to flash memory. The stage commands are prepared, ordered and stored in a staging memory prior to execution of the commands and corresponding access to flash memory. This allows stage commands to be consecutively executed.

A host might not provide a sequence of host commands and/or provide host commands at a rate that is conducive to the performed reordering. As a result, stage slots of the staging memory may not be filled with stage commands prior to access availability of a flash array. The systems and methods include partially or fully filling stage slots with available host commands and leaving stage slots empty (instead of waiting for additional host commands). Balanced data transfer rate timing is provided to partially or fully fill stage slots while not holding up a host when a transfer rate of the host increases.

Delaying execution of stage commands of a stage slot can affect execution times of stage commands of subsequent stage slots. Leaving stage slots empty can reduce effects on delays associated with a current stage slot and execution delays of stage commands for subsequent stage slots.

In FIG. 1, a storage system 10 is shown. The storage system 10 includes a host 12 and a SSD 14. The host 12 includes a host control module 16 and a host interface 18. The host 12 may be a computer, a mobile phone, a personal data assistant, etc. The SSD 14 includes a drive interface 20, a drive control module 22, and a flash memory module 24.

In operation, the host control module 16 generates host commands (host command signals) to access flash memory 26 of the flash memory module 24. The flash memory 26 may include, for example, non-volatile memory, such as NAND type memory (i.e. NAND flash memory). The drive control module 22 reads data from the flash memory 26, writes data to the flash memory 26 and/or removes data from the flash memory 26 based on the host commands.

During a write operation, the host control module 16 may generate data signals, which include data that is to be stored in the flash memory 26. During a write operation, data is transferred from the host 12 to a data buffer 28 of the SSD 14 and then transferred to the flash memory module 24. During a read operation, data is read from the flash memory 26, is transferred to the data buffer 28, and is then transferred to the host 12 via the interfaces 18, 20. The data buffer 28 may be distinct from the drive control module 22 and the flash memory 26 and may be used as a temporary storage device. The data buffer 28 may be, for example, volatile memory, such as random access memory (RAM).

The drive interface 20 receives the host commands based on communication with the host interface 18. The drive interface 20 and the host interface 18 may be, for example, serial advanced technology attachment (SATA) interface, small computer system interface (SCSI), serial attached SCSI (SAS) interfaces, etc.

The drive control module 22 includes a host command buffer 29, a packaging and staging (PS) module 30, a staging memory 32 (or staging queue), and a data transfer module 34. The host command buffer 29 receives the host commands via the drive interface 20. The PS module 30 accesses the host commands in the host command buffer 29 and generates stage commands, which are provided to the staging memory 32. The host commands may include logical block addresses (LBAs), buffer addresses, a data length, etc.

The LBAs of the host commands refer to memory locations in the flash memory 26 where data is located and/or is to be stored. The data buffer 28 addresses refer to locations within the data buffer 28 where data is located and/or is to be stored. The data length may indicate, for example, a number of pages of data to transfer in association with a current read or write command. A page of data may have a certain length (e.g., 4 kilobytes (kB)) and may refer to a smallest amount of data to be transferred between the host 12 and the SSD 14 during a read or write operation.

The PS module 30 converts the LBAs to physical block addresses (PBAs), which refer to physical locations within the flash memory 26. The PS module 30 may store, for example, a LBA-to-PBA table 38 in a drive control memory, such as in one of first and second drive control memories 40, 42.

For example, during a first write operation a LBA may be converted to a first PBA. During a second write operation the LBA may be converted to a second PBA that is different than the first PBA. The PS module 30 determines the appropriate PBAs for efficiency during current and subsequent read and write operations. For example, the PBAs of a set of pages may be selected for writing of data to and/or reading of data from the flash memory 26 via parallel channels. There may not be a direct one-to-one relationship between the LBAs and the PBAs. The PBA entries in the LBA-to-PBA table 38 are not fixed values and may be changed by the PS module 30.

The PS module 30 may also package and/or reorder host commands based on, for example, the corresponding data lengths and access locations in the flash memory 26. Data corresponding to multiple host commands may be packaged and/or grouped such that a track of data is written to and/or read from the flash memory 26 during an access period. A track of data may include any number of pages. The PS module 30 may group the host commands to provide a full stage of data to be transferred during the access period. A stage refers to storing stage commands in a staging memory 32 and accessing a flash array according to the stage commands. The host commands may also be grouped based on command priority levels assigned to each command by the host 12 and/or by the drive control module 22.

A full stage of data may refer to, for example, a track of data. Although a partial track may be transferred, transfer of a full track is more efficient. This is because the same amount of storage time is associated with storing a partial track and a full track. For this reason, the PS module 30 groups host commands to transfer up to a track or a full stage of data.

The host commands may refer to random locations in the flash memory 26. A portion of the random locations may include consecutive accesses to the same location within the flash memory 26. The host commands may be reordered and/or reassigned to different parallel locations in the flash array to improve access times.

The staging memory 32 may be a first-in-first-out (FIFO) type memory. Stage commands from the PS module 30 are "dropped into" (stored in) the staging memory 32. The stage commands may be associated with one or more host commands. The stage commands include the PBAs, the buffer addresses, and data lengths. The data lengths refer to the amounts of data stored at or to be stored at the PBAs and buffer addresses. The stage commands may be read from the staging memory 32 in the order in which the stage commands are stored in the staging memory 32.

The data transfer module 34 transfers data between the data buffer 28 and the flash memory module 24 according to the stage commands. Each stage command is associated with a stage and an access period. A stage refers to: storing a stage command in the staging memory 32; and transferring data associated with the stage command between the data buffer 28 and the flash memory 26. A stage has a start time and an end time. The start time is when the stage command is stored in the staging memory 32. The end time is when the data transfer associated with the stage command is completed by the flash memory module 24. A stage duration refers to an amount of time between the start time and the end time.

During a write operation, the flash memory module 24 may generate a complete signal CMP (e.g., a track done signal) when the last page of data associated with a stage command is written to the flash memory 26. During a read operation, the flash memory module 24 may generate the complete signal CMP when the last page of data associated with a stage command is read from the flash memory 26. The complete signal indicates when access to a flash array of the flash memory 26 is completed. The complete signal CMP may also be referred to as a feedback signal.

Although the complete signal CMP is shown as being generated by the flash memory module 24, the complete signal CMP may be generated by, for example, the data transfer module 34. The flash memory module 24 may indicate when access of a bucket of a flash array is complete. A bucket may be a distinct memory device that stores a page of information. The data transfer module 24 may generate the complete signal CMP when access to buckets of a flash array is completed. Buckets and flash arrays are described below with respect to FIGS. 3-5.

The drive control module 22 may include the first drive control memory 40 and/or may access the second drive control memory 42. Software (or firmware) executed by the PS module 30 and the data transfer module 34 may be stored in one or more of the drive control memories 40, 42. The PS module 30 and the data transfer module 34 may access and execute code stored in the drive control memories 40, 42. The drive control memories 40, 42 may be part of the drive control module 22 or may be distinct from the drive control module 22.

Figure 2:
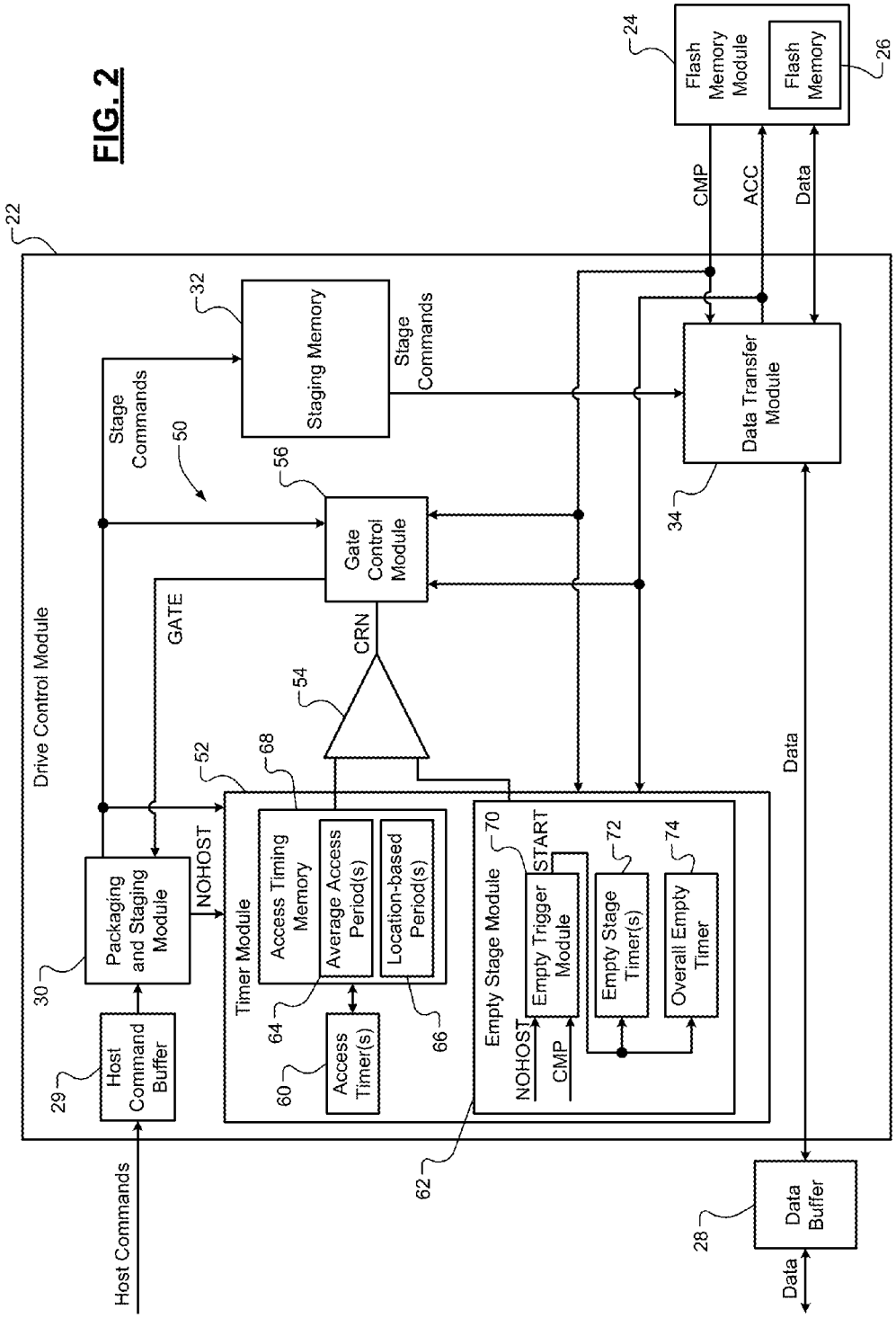
FIG. 2 is a functional block diagram of a drive control module in accordance with the present disclosure.

Referring now also to FIG. 2, the drive control module 22 is shown. The drive control module 22 includes the host command buffer 29, the PS module 30, the staging memory 32 and the data transfer module 34. The drive control module 22 further includes an empty stage monitoring system 50 that includes a timing module 52, a comparison module 54 and a gate control module 56.

Time for a flash array to complete a data transfer (e.g., a programming transfer) is variable. Flash array specifications may include minimum, maximum and typical access durations, but actual access durations can vary. Actual access durations can be different over time in: flash arrays; in storage locations of a flash array; and a storage location of a flash array. This variability can cause difficulty in predicting stage slot wait periods. To overcome the issues associated with this variability, average access periods are monitored and used to determine durations and/or end times of stage slot wait periods.

The PS module 30 and the data transfer module 34 control and regulate access to the flash memory module 24 and/or the flash memory 26 to equalize access timing. This control and regulation includes determining when to fill stage slots and when to leave stage slots empty. This control and regulation is provided based on timing of complete signal CMP generation, average and location-based timer values (or periods), and empty stage timer values (or periods), which are defined below. The average and location-based timer values and the empty stage timer values are generated and stored by the timing module 52. Complete signals CMP are generated when an access event of the flash memory 26 is completed within the flash memory module 24.

Stage command storage timing is provided via the gate control module 56. The gate control module 56 operates based on signals from the data transfer module 34, the flash memory module 24, and the comparison module 54. The comparison module 54 generates a comparison signal CRN based on the average and location-based timer values and the empty stage timer values received from the timing module 52.

A stall period of a flash array may be interrupted or end due to generation of an end-of-empty stage trigger, such as generation of the comparison signal CRN. A flash array is stalled when the flash array is not involved (i.e. is not used) in an access operation. The end-of-empty stage trigger may be generated based on a comparison between an average access period and a corresponding empty stage timer value.

The timing module 52 includes access timer(s) 60 and an empty stage module 62. The access timer(s) 60 may store average access period(s) 64 and/or location-based period(s) 66 in an access timing memory 68. The average access period(s) 64 and/or location-based period(s) 66 are updated periodically and/or based on access to account for memory usage, access patterns and aging. The access timing memory 68 may be part of the timer module 52 or may be distinct from the timer module 52 and/or the drive control module 22.

The average access period(s) 64 may include: an average storage period (flash programming sequence period) for the flash memory 26; an average storage period for flash arrays of the flash memory 26; an average storage period for buckets of a flash array; an average read period for the flash memory 26; an average read period for flash arrays of the flash memory 26; an average read period for buckets of a flash array; etc.

A flash array may store a track of information and includes multiple buckets. Each bucket may refer to, for example, a memory integrated circuit (IC) or memory chip. A page of information may be stored in each bucket. The buckets may be distinct memory devices. A flash array may have any number of buckets. The flash arrays of the flash memory 26 may each have the same or different number of buckets.

The average access period(s) 64 may also include average stage durations. Flash array accesses may include read, write and/or remove accesses. A stage duration begins when stage commands for a stage are stored in the staging memory 32 and ends when data access for the stage commands is completed in the flash memory module 24.

Figure 3:
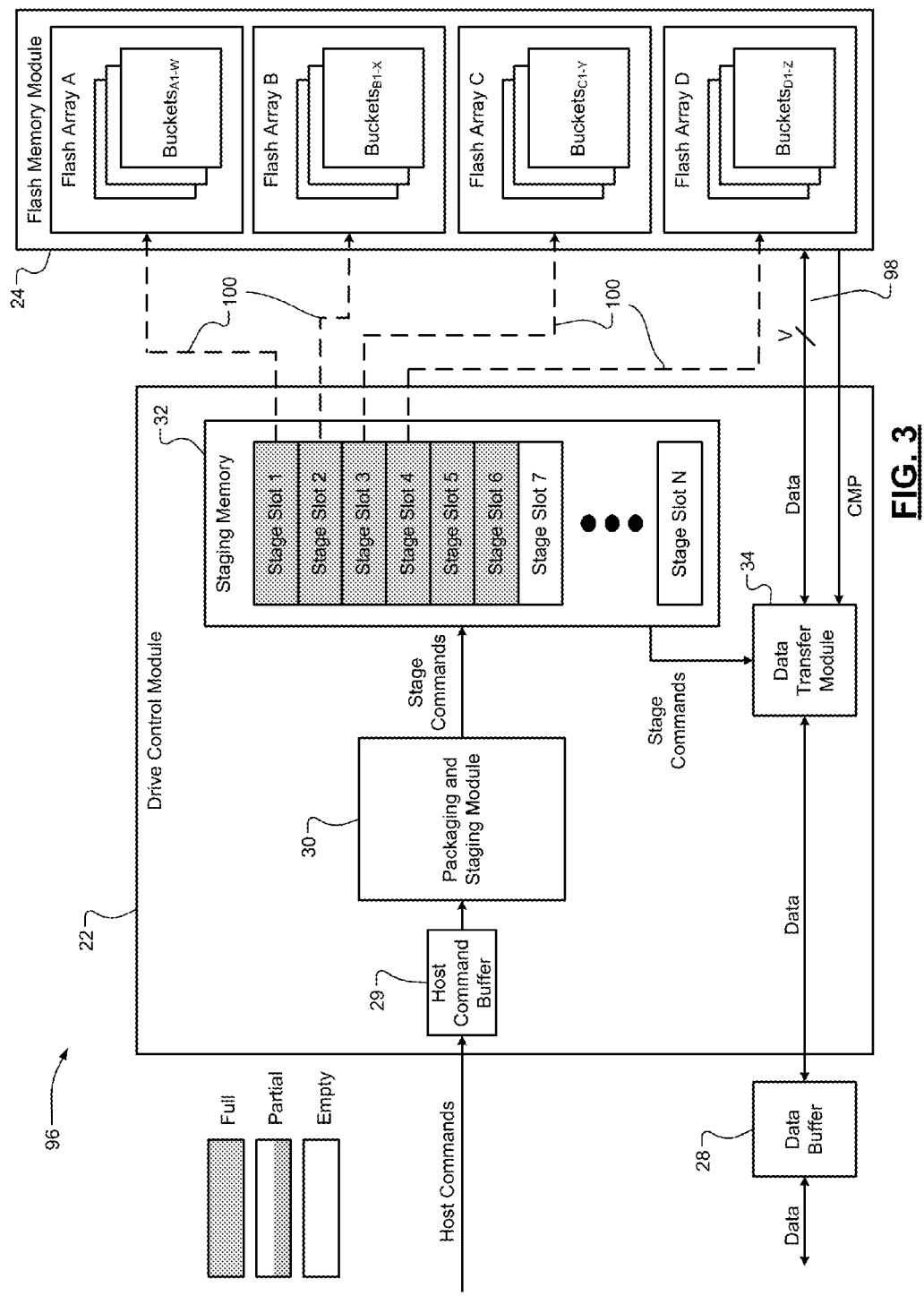
FIG. 3 is a functional block diagram of a portion of the storage system of FIG. 1 illustrating an example of a pipelining process with full stage slots in accordance with the present disclosure.
Figure 4:
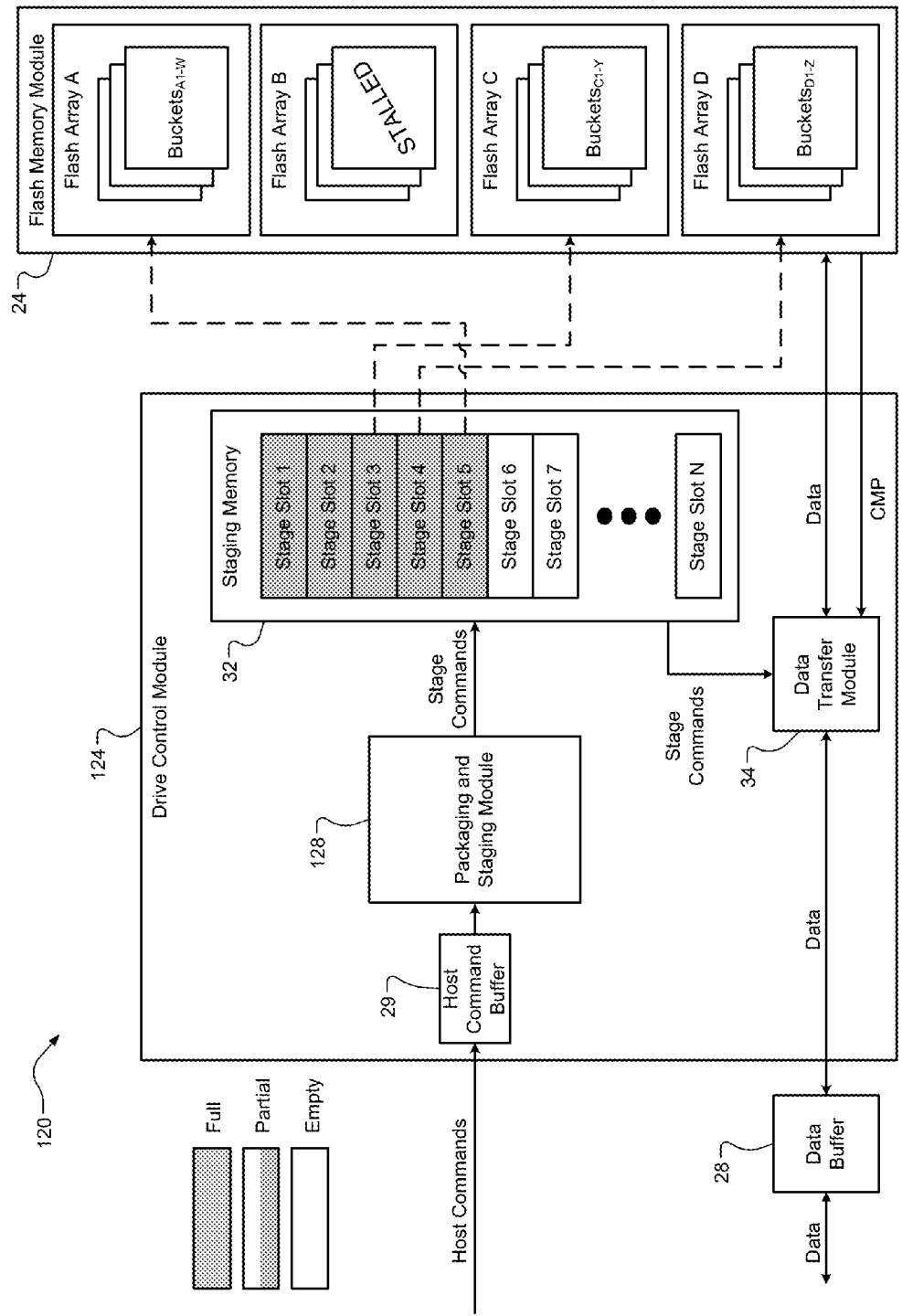
FIG. 4 is a functional block diagram of a portion of a storage system illustrating a pipelining process with a stalled array.
Figure 5:
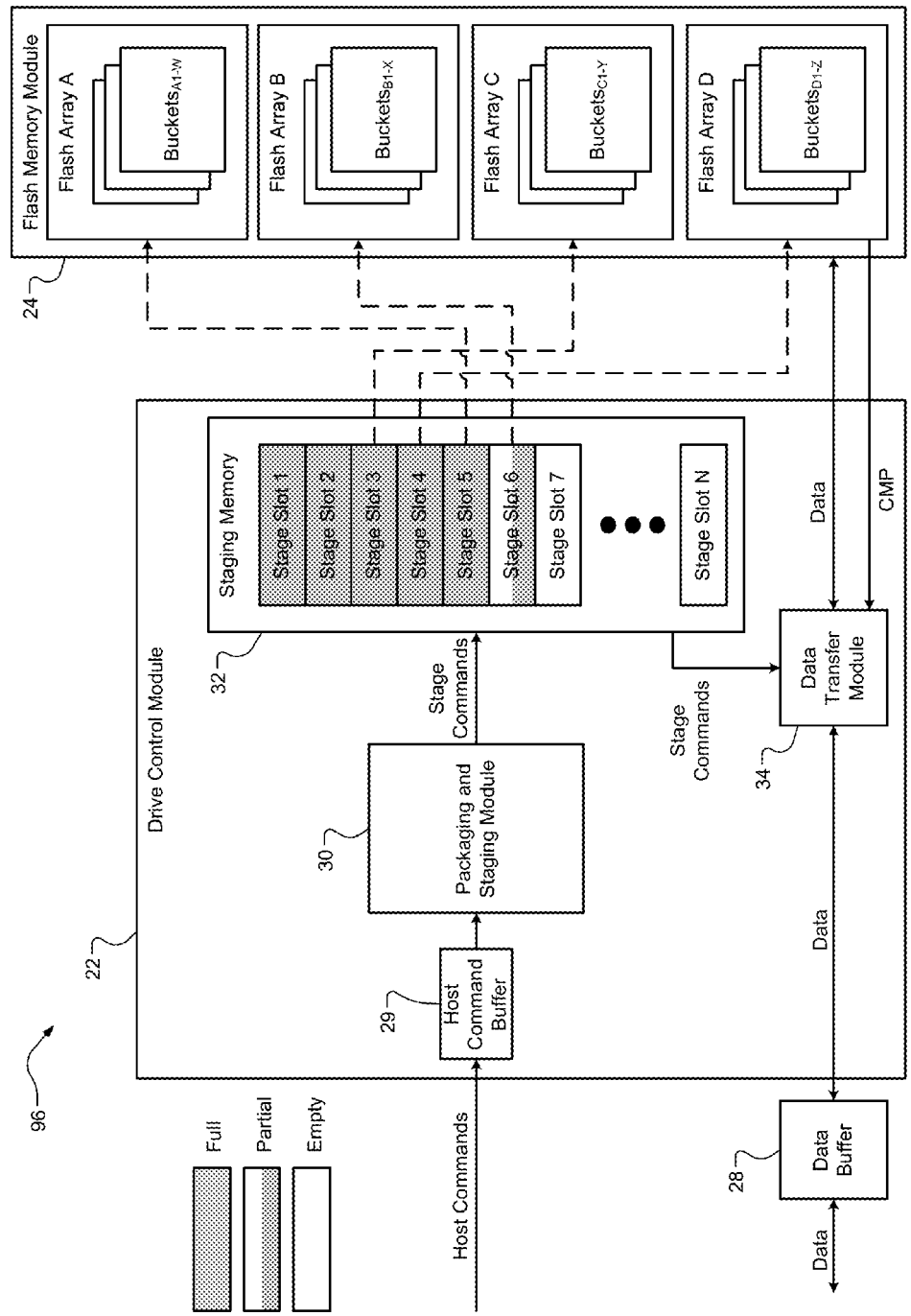
FIG. 5 is a functional block diagram of a portion of the storage system of FIG. 1 illustrating an example of a pipelining process with non-full stage slots in accordance with the present disclosure.

The location-based period(s) 66 may include location-based averages, such as an average storage period for each flash array, an average storage period for each bucket, etc. Example flash arrays A-D and corresponding buckets are shown in FIGS. 3-5. The location-based period(s) 66 may also include average bucket specific stage durations. A bucket specific stage duration begins when a stage command for a bucket is stored in the staging memory 32 and ends when data access of the bucket is completed.

The average and location-based timer values may be weighted and/or running average values. For example, when the average and location-based timer values are weighted averages, access times may be weighted based on age. The most recently generated access times may be given more weight than the least recently generated access times. The weighted accesses times are then averaged to arrive at the average timer value (or period). As another example, when the average and location-based timer values are running averages, a last predetermined number of timer values (e.g., the last 1000 storage times) may be averaged.

The access timer(s) 60 may be initiated based on, for example, stage command signals and/or access command signals generated by the PS module 30 and the data transfer module 34. The access timer(s) 60 may be stopped based on, for example, the complete signal CMP.

The empty stage module 62 includes an empty trigger module 70, empty stage timer(s) 72. The empty trigger module 70 triggers the empty stage timers 72 based on the complete signal CMP or an empty stage time out signal (end-of-empty stage trigger), and a host status signal NOHOST. The host status signal NOHOST indicates when host commands are not in the host command buffer 29. The complete signal CMP indicates when stages and/or flash memory access events are complete. The empty trigger module 70 generates a timer trigger signal START based on the complete signal CMP and the host status signal NOHOST.

The empty stage timer(s) 72 store empty timer values or periods. An empty period refers to a period when the host command buffer 29 does not have host commands. An empty timer period may begin at an end of an access stage when the host command buffer 29 does not have a host command. An access stage includes performing a read, write and/or remove operation on the flash memory 26. A non-access stage refers to a dummy stage when a read, write and/or remove operation of the flash memory 26 is not performed. A non-access stage ends based on output of the comparison module 54.

The empty stage timer(s) 72 may store empty periods associated with each stage. An empty stage timer may begin timing an empty period for a stage when a complete signal (e.g., the complete signal CMP) is generated or an empty stage time out signal is generated, and the host command buffer 29 does not have a host command or the PS module 30 does not receive a host command.

The empty stage timer(s) 72 may increase or decrease in value until reset. The empty stage timer(s) 72 may be reset to 0 and count up or reset to an average and/or location-based timer value and count down. The empty stage timer(s) 72 may be reset each time a timer trigger signal is generated. This may occur, for example, when a stage is left empty.

The comparison module 54 compares values generated by the access timer(s) 60, the average access period(s) 64, and/or the location-based period(s) 66 with values of the empty stage timer(s) 72. Output of the comparison module 54 may be set HIGH (or TRUE) when one or more values of the empty stage timer(s) 72 decrease to a predetermined value such as 0 or alternatively are equal to or greater than the corresponding values of the access timer(s) 60 and/or periods 64, 66. For example, when an empty stage timer value is equal to or exceeds an average storage period for a flash array, the output (comparison signal CRN) of the comparison module 54 may be set HIGH. This indicates to the gate control module 56 that a timer period typically associated with a stage of the flash array has lapsed. The comparison signal CRN may be referred to as a time out signal.

The gate control module 56 generates a gate control signal GATE based on the complete signal CMP received from the flash memory module 24 and/or based on the comparison signal CRN received from the timer module 52. The gate signal indicates when stages and/or flash memory access events are complete and/or when a timeout event has occurred.

The gate control signal GATE and the complete signal CMP may be generated for each stage and corresponding flash array. The PS module 30 transfers a next stage command when available to the staging memory 32 based on the gate control signal GATE. The gate control module 56 sets the gate control signal GATE HIGH when either the complete signal CMP for a stage of interest is HIGH and/or the comparison signal CRN for the stage of interest is HIGH.

The gate control module 56 may determine if a flash array is stalled based on a state of a stage slot of the staging memory 32. The gate control signal GATE may be generated based on the state of the stage slot. The gate control module 56 tracks when stage commands are stored in the staging memory 32 and in what stage slots of the staging memory 32. This allows the gate control module 56 to track which stage slots of the staging memory 32 are empty, partially full and full.

The flash memory module 24 performs read, write and/or remove operations based on an access command signal ACC. The access command signal ACC indicates buffer addresses, PBAs and data lengths to the flash memory module 24 for an access event. The flash memory 26 responds to the data transfer module 34 when the read, write and/or remove operations are completed in the flash memory module 24. The complete signal CMP may be generated for each page and/or track read from, written to, and/or removed from the flash memory 26.

The gate control module 56 sets the gate output signal GATE LOW when the complete signal CMP is LOW and the comparison signal CRN is LOW. The gate control module 56 may also set the gate control signal GATE LOW a predetermined period after the complete signal is set HIGH. The above operation of the gate control module 56 allows for periodic storing of stage commands in the staging memory 32 when available.

In FIG. 3, a portion 96 of the storage system 10 is shown. The portion 96 includes the drive control module 22, the flash memory module 24, the data buffer 28, and the host command buffer 29. The drive control module 22 includes the PS module 30, the staging memory 32 and the data transfer module 34. The PS module 30 receives host commands and converts the host commands to stage commands. The stage commands may be grouped to form a stage command pack, which is stored in the staging memory 32. A stage command pack may have a corresponding stage slot in the staging memory 32. Stage slots 1-N (referred to as an N-deep pipeline) are shown in FIG. 3 and are associated respectively with stages 1-N. The stage slots 1-N may be accessed in the order in which stage commands are stored.

A stage slot may be considered a full slot, a partial slot or an empty slot. A stage slot may be considered a full slot when the stage command pack includes commands: to transfer data to fill a flash array; to read all of the data stored in a full flash array; and/or to transfer a predetermined maximum amount of data in a predetermined period to and/or from the flash array. A predetermined maximum amount of data refers to an amount of data that can be transmitted on parallel channels of a data bus 98 to and/or from buckets of a flash array in the predetermined period. The predetermined maximum amount may be limited by the number of channels, the number of buckets, and/or the predetermined period.

In the example shown, the flash memory module 24 includes flash arrays A-D. Each of the flash arrays A-D includes respective buckets $A_{1-W}$, $B_{1-X}$, $C_{1-Y}$, $D_{1-Z}$, where W, X, Y, and Z are the number of buckets and the number of corresponding channels of flash arrays A-D. The data bus 98 may have V channels. V, W, X, Y and Z may be integers greater than 1. The number of channels V may be equal to the number of buckets in one or more of the flash arrays A-D.

For example, a stage slot may be considered a full slot when: a stage command pack of the stage slot includes commands to transfer a track to a flash array; and capacity of the flash array is a track. A stage slot may be considered a partial slot when corresponding stage commands do not indicate transferring a track of data. As another example, a stage slot may be considered a full slot when: a stage command pack of the stage slot includes commands to transfer a track to a flash array; and a maximum amount of data that can be transferred to the flash array within a predetermined period is a track.

A stage slot may be considered an empty slot when a stage command is not stored in the stage slot or a dummy command is stored in the stage slot. A dummy command may be stored in a stage slot and indicate that an access event is not to be performed during a current stage.

Stage commands may be prepared, ordered and/or stored in one or more of the stage slots 1-N prior to access availability of a flash array. Stage slots 1-6 are full stage slots. Stage slots 7-N are shown as empty. The stage slots 1-4 are associated with respective ones of the flash arrays A-D. This is shown by dashed lines 100. The dashed lines 100 do not indicate communication between the stage slots 1-N and the flash arrays A-D. Although 4 flash arrays are shown, the flash memory module 24 may include any number of flash arrays. The data transfer module 34 transfers data associated with stage commands in the stage slots 1-4 between the data buffer 28 and respective ones of the flash arrays A-D.

Each bucket in the flash arrays A-D may be associated with a certain channel. For example, the first flash array A may include the buckets $A_{1-W}$. Data may be transferred on W channels of the data bus 98 between the data buffer 28 and the first flash array A such that each of the buckets $A_{1-W}$ is accessed in parallel and during the same period. If there is not a sufficient number of channels to communicate with the first flash array A while communicating with one or more of the flash arrays B-D, than the channels may be switched between the flash arrays A-D.

If there are sufficient channels to communicate with the buckets $A_{1-W}$, $B_{1-X}$, $C_{1-Y}$, $D_{1-Z}$ in the flash arrays A-D during the same period, then switching of channels between the flash arrays A-D might not be performed. In this example, the total number of channels on the data bus 98 is equal to the sum of W, X, Y, Z (W+X+Y+Z).

The data transfer module 34 may cycle through the flash arrays A-D consecutively, iteratively, and/or as the flash arrays A-D become available. In the example shown, the data transfer module 34 iteratively cycles through the flash arrays A-D consecutively (returning to flash array A subsequent to initiating access to flash array D). For example, the data transfer module 34 proceeds to perform stage commands in the stage slot 5 when the complete signal CMP indicates that stage 1 is completed. The stage commands of the stage slot 5 are performed subsequent to completing the stage commands of the stage slot 1. Similarly, stage commands of stage slot 6 are performed subsequent to completing stage 2. The stage commands of stage slots 5 and 6 may be performed subsequent to completing the stage commands of respective stage slot 1 and 2 without delay.

In FIG. 4, a portion 120 of a storage system illustrating a pipelining process with a stalled array is shown. The portion 120 includes the data buffer 28, a drive control module 124, and the flash memory module 24. The drive control module 124 includes the host command buffer 29, the staging memory 32 with stage slots 1-N, the data transfer module 34 and a PS module 128. The flash memory module 24 includes the flash arrays A-D.

Figure 7:
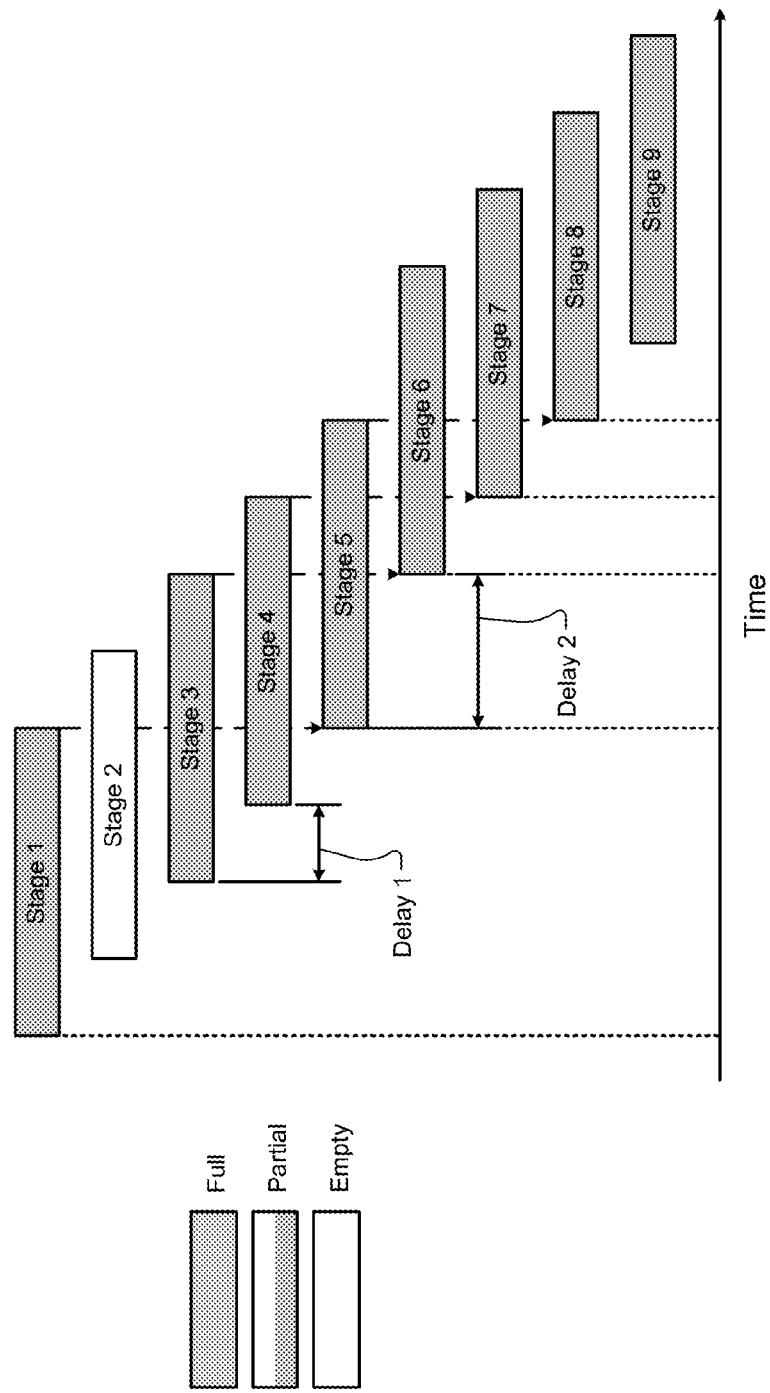
FIG. 7 is a stage timing diagram illustrating start time delay changes due to an empty stage.

The data transfer module 34 accesses the flash arrays A-D consecutively and iteratively. In the example of FIG. 4, stage slot 6 is empty, which causes flash array B to stall subsequent to completing stage 2. Since stage slot 6 is empty, the data transfer module 34 does not receive stage commands to access flash array B. Also, when flash array B is not accessed, the flash memory module 24 does not generate the complete signal CMP and/or the complete signal CMP does not indicate that access to flash array B is completed. This can cause a duration of stage 6 to increase and can delay execution of subsequent stages. Although not shown in FIG. 4, stage slots subsequent to stage slot 6 may be partially and/or fully filled. Delaying of subsequent stages is illustrated in FIG. 7.

Figure 8:
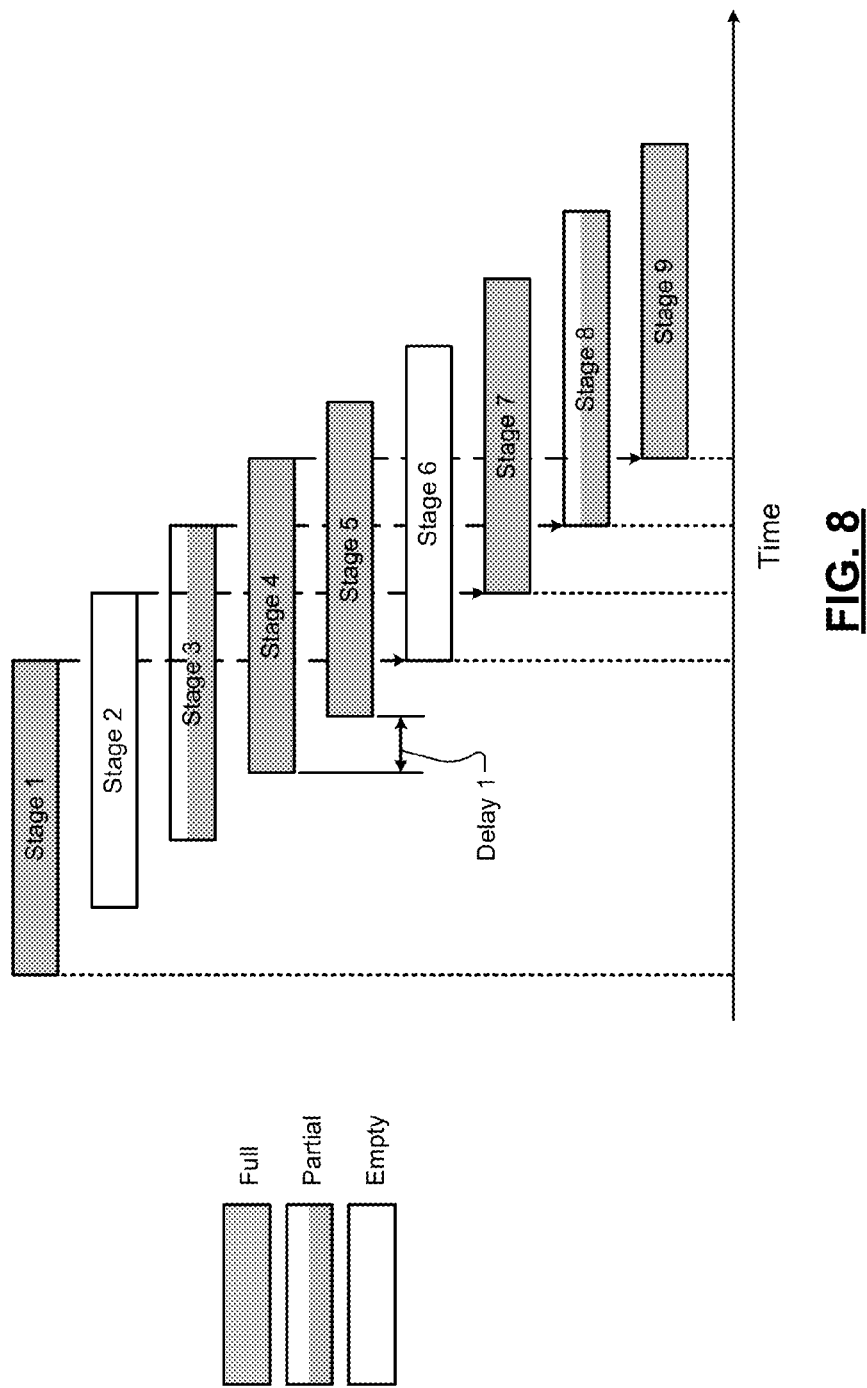
FIG. 8 is a stage timing diagram with an empty stage and uniform start time delays in accordance with the present disclosure.

The number of stalled flash arrays may be minimized and the duration that a flash array is stalled may be decreased by: partially filling flash arrays, reordering stage commands to fill stage slots, and/or using the empty stage monitoring system 50 of FIG. 2 to limit stage durations. Partial filling of stage slots is shown in FIGS. 5 and 8. FIG. 8 also shows uniform delayed stage start times due to use of the empty stage monitoring system 50 and corresponding end-of-empty stage trigger(s).

Referring again to FIG. 2 and also to FIG. 5, the portion 96 of the storage system 10 is shown illustrating an example of a pipelining process with non-full stage slots. A non-full stage refers to a stage that is partially full or empty. The portion 96 includes the data buffer 28, the drive control module 22 and the flash memory module 24. The flash memory module 24 includes the flash arrays A-D. The drive control module 22 includes the PS module 30, the staging memory 32 and the data transfer module 34. The staging memory 32 includes the stage slots 1-N.

Stage slot 6 is partially filled to prevent stalling of flash array B and subsequently accessed flash arrays. The amount of time to access a flash array according to a partially filled slot is the same as the amount of time to access a flash array according to a fully filled slot. The amount of time is the same since the buckets of a flash array are accessed in parallel and during the same period. A sub-set of the buckets are accessed when a stage slot is partially filled. All of the buckets of a flash array may be accessed when a stage slot is fully filled. For these reasons, partial filling of stage slots prevents stalling of a flash array.

Figure 6:
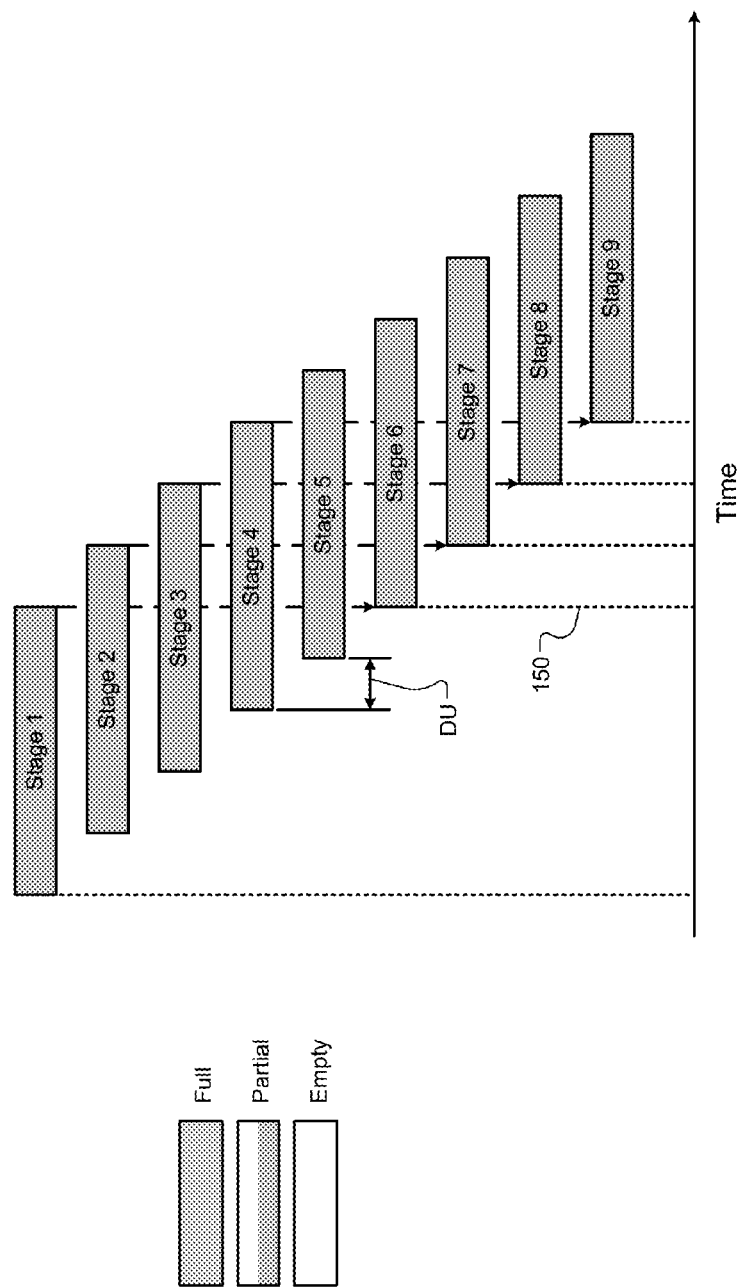
FIG. 6 is a stage timing diagram with full stages in accordance with the present disclosure.

In FIG. 6, a stage timing diagram is shown with full stages 1-9. A full stage refers to a stage period of a full stage slot. The stage period begins when stage commands of the full stage slot are stored in the stage slot. The stage period ends when, for example, a complete signal (e.g., the complete signal CMP) indicates that flash memory access corresponding to the stage commands is complete.

The stage periods overlap due to parallel access of a flash memory. For example, flash arrays associated with stages 1-5 may be accessed during the same period. This improves access times.

Start times of each stage are delayed relative to a start time of a previous stage. The delays may be uniform. In the example of FIG. 6, the start time delays are uniform (one of the delays is identified as DU). This provides regular starting of the stages 1-9. The start time delays are provided to maintain constant and regular access of flash memory.

Stage slots of a staging memory of a SSD may be empty when a host first accesses the SSD. Predetermined delay periods may be used to provide uniform start time delays (e.g., 200 μs) for each stage. Once the delays are initialized for each stage associated with a first time access to a flash array, the start time delays are automatically maintained for subsequent stages. This is due to the triggering of a subsequent stage based on a complete signal or a time out signal, as described herein.

Stages associated with the same flash arrays may be performed consecutively without delay. For example, stages 1 and 6 are associated with the same flash array. Stage 6 is performed subsequent to stage 1 without delay, as indicated by line 150.

In FIG. 7, a stage timing diagram is shown illustrating start time delay changes due to an empty stage. Stages 1-9 are shown. In general, start times of the stages 1-9 are delayed, as shown by Delay 1.

Stages 1 and 3-9 are full stages. Stage 2 is an empty stage. An empty stage refers to a stage period of an empty stage slot. A flash array associated with stage 2 is stalled as the stage slot does not contain stage commands. Since the stage slot does not include stage commands, the flash array is not accessed and a complete signal for the flash array is not generated. This can cause accesses to subsequent flash arrays to be delayed, as shown by Delay 2. For example, stage 6 may not be started until a complete signal is received indicating completion of stage 3.

The delays caused by the empty stage may be prevented by triggering stage 6 to start without receiving a complete signal from a flash memory module. Stage 6 is triggered to start at an estimated time when stage 2 would have completed had stage 2 included executing stage commands. An empty stage timer is started at the beginning of stage 2. Stage 6 may be triggered to start when the empty stage timer is equal to or exceeds, for example, an average stage period associated with the flash array of stage 2.

In FIG. 8, a stage timing diagram is shown with an empty stage and uniform start time delays. Stages 1-9 are shown. Stages 1, 4, 5, 7 and 9 are full stages. Stages 3 and 8 are partial stages. Stages 2 and 6 are empty stages.

Start times of each of the stages 1-9 have uniform delays relative to previous stages (one of the delays is shown as Delay 1). The uniform delays are maintained due to (i) triggering stages when an empty stage arises and (ii) the partial filling of stages. For example, stage 7 is performed at the completion of stage 2, stage 8 is performed at the completion of stage 3, etc.

The uniform delays may include a predetermined delay period. The predetermined delay period may be selected and/or based on device delays in a SSD. The delay period may be selected and/or based on the number of flash arrays (i.e. the "depth" of a pipeline or number of stage slots in a staging memory) and speed of the flash memory.

Figure 9:
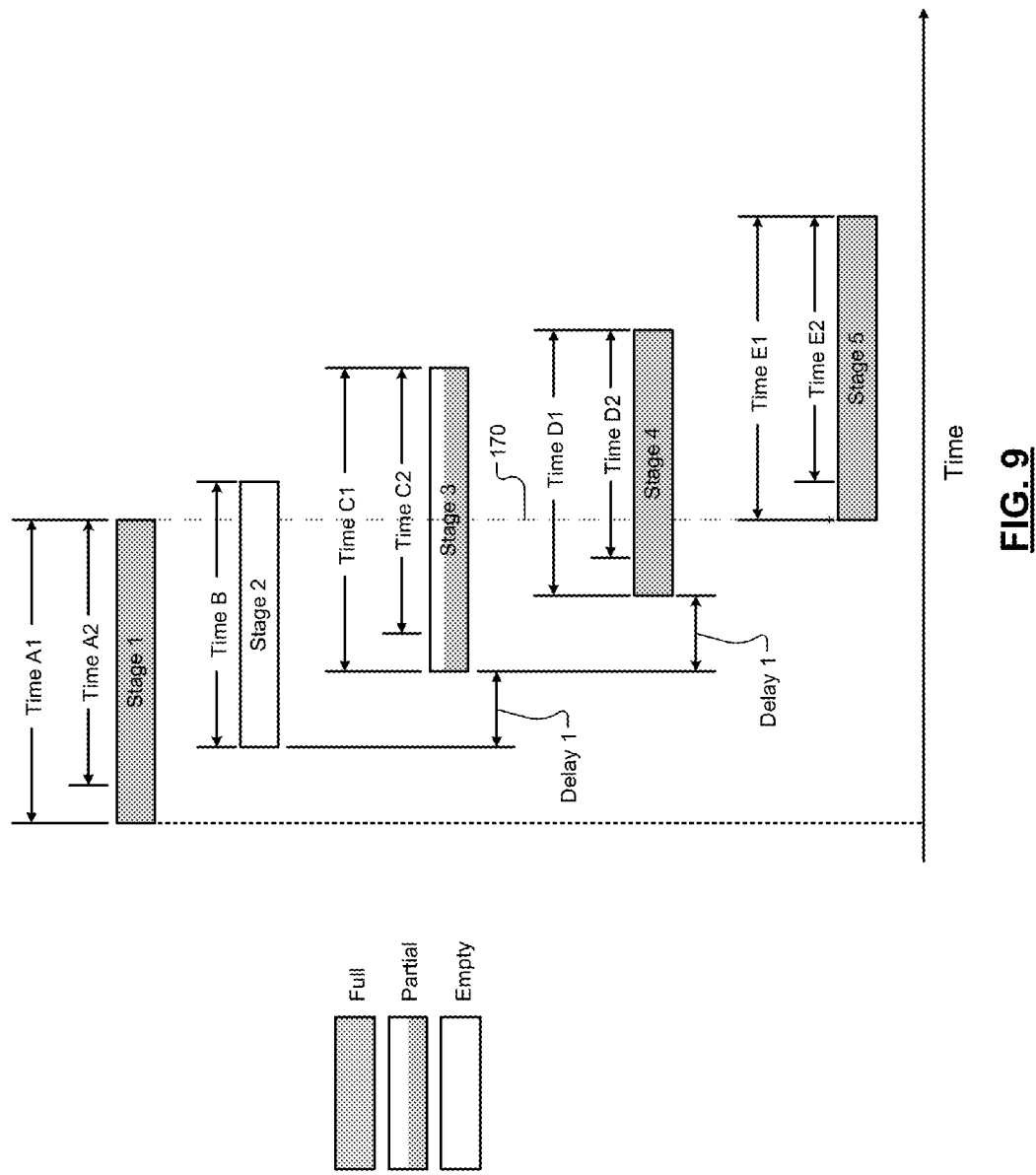
FIG. 9 is a stage timing diagram illustrating uniform start time delays and varying stage durations in accordance with the present disclosure.

In FIG. 9, a stage timing diagram is shown illustrating uniform start time delays and varying stage durations. Stages 1-5 are shown. Stages 1, 4 and 5 are full stages. Stage 3 is a partial stage. Stage 2 is an empty stage. Start times of stages 2-5 are delayed by delay period Delay 1 relative to respective previous stages 1-4.

Stages 1 and 3-5 have associated stage periods A1, C1, D1 and E1 and flash array access periods A2, C2, D2 and E2. Stage 2 has an associated stage period B. The stage periods A1, B, D1 and E1 begin when stage commands are stored in a staging memory. Stage period C1 may begin, for example, according to the delay period Delay 1 and/or when a dummy stage command is stored in the staging memory during stage period B. Stage period C1 may also begin at completion of a previous stage, where the previous stage is associated with the same flash array as stage 3.

The flash array access periods A2, C2, D2 and E2 begin when a flash array is accessed according to the stage commands. The stage periods A1, C1, D1 and E1 and the flash array access periods A2, C2, D2 and E2 end when a complete signal is received and/or when a complete signal indicates that access of a flash array for the given stage is completed. Stage 5 may be performed at the end of stage 1, as shown by line 170.

Figure 10:
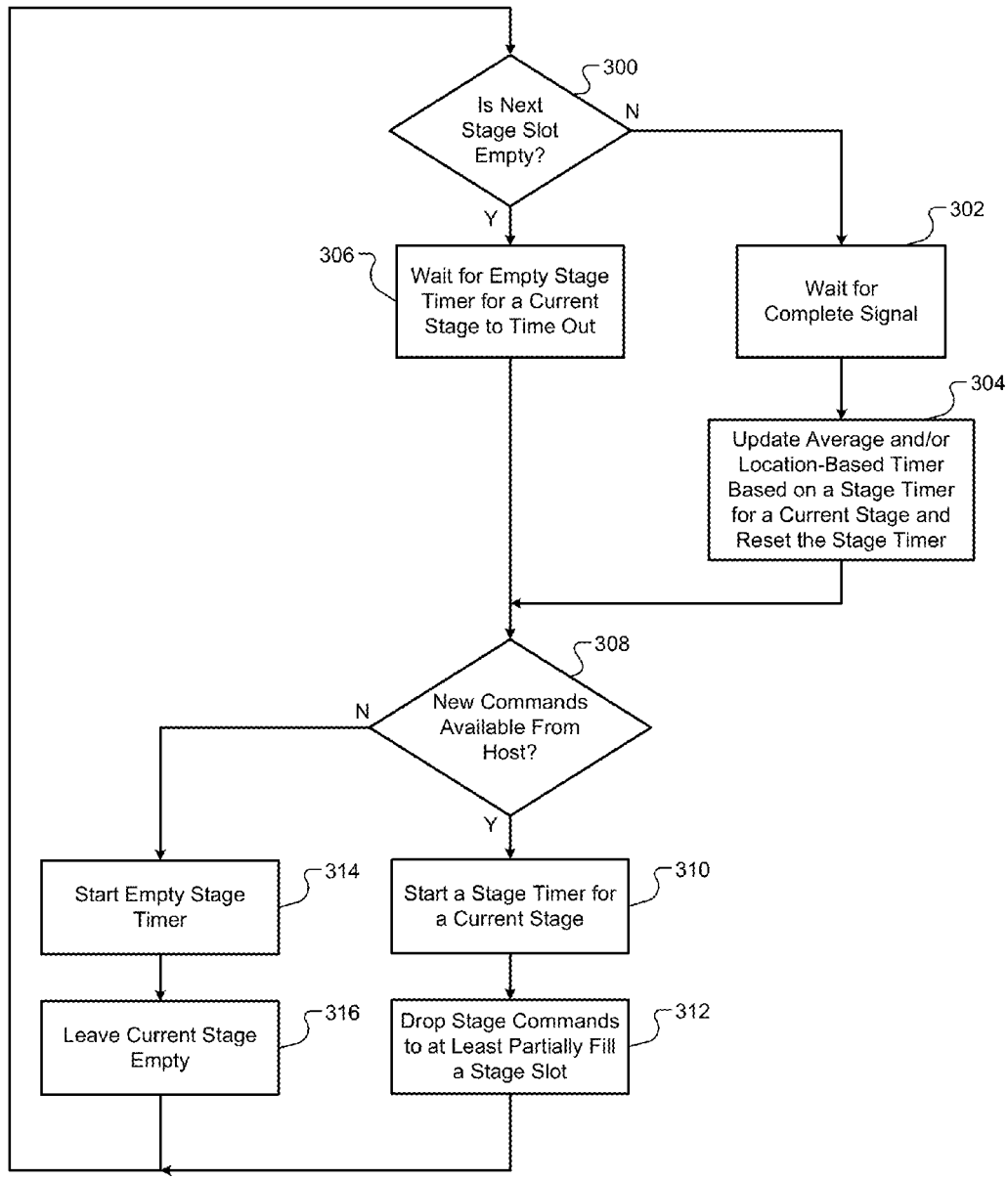
FIG. 10 illustrates a method of accessing flash memory in accordance with the present disclosure.

Referring again to FIG. 2 and to FIG. 10, a method of accessing the flash memory 26 is shown. Although the following tasks are described primarily with respect to FIGS. 1, 2, 5, 6 and 8, the following tasks may be applied to other implementations of the present disclosure. The following tasks are performed iteratively.

While the following tasks are performed, the PS module 30 may receive and convert host commands to stage commands and/or stage command packs. This may include reordering and grouping of the host commands to generate stage command packs. The PS module 30 groups commands to at least partially fill stage slots when the stage commands are stored in the stage slots.

At 300, the PS module 30 and/or the gate control module 56 determine if the next stage slot (stage slot subsequent to a current stage slot) in the staging memory 32 is empty.

At 302, the PS module 30 and/or the gate control module 56 wait for a complete signal (e.g., the complete signal CMP or a track done signal). The complete signal indicates the end of a current stage. The PS module and/or the gate control module 56 proceed to task 304 when the complete signal is received.

The PS module 30 may wait for access completion of a flash array (e.g., flash array B) according to stage commands in a corresponding stage slot (e.g., stage slot 2) to fill the next stage slot (e.g., stage slot 7) of the flash array (e.g., flash array B). This is shown in FIG. 6.

While waiting, the data transfer module 34 performs read and/or write operations and transfers data between the data buffer 28 and the flash memory 26 according to the stage command(s) in a current stage slot. Data is transferred between the data buffer 28 and the flash memory 26 through the drive control module 22. The data may be modified by the drive control module 22. For example, the drive control module 22 may perform error correction coding (ECC) before storing on the flash memory 26.

The flash memory module 24 accesses the flash memory 26 according to the stage commands. The flash memory module 24 accesses the first available flash array (e.g., flash array A of FIG. 5) based on the stage commands in the current state slot (e.g., stage slot 1 or stage slot 5 of FIG. 5).

At 304, the timer module 52 updates an average and/or location-based period based on an access timer for a current stage. The timer module 52 also resets the access timer for the current stage. The access timer is a measurement timer and may be reset to 0. The access timer may be reset after use at 304 and/or before being started again at 310.

At 306, the PS module 30 and/or the gate control module 56 wait for an empty stage timer for the current stage to time out. Task 306 is performed subsequent to task 314. The gate control module 56 determines whether the comparison signal CRN is, for example, HIGH. This may occur when the empty stage timer has decremented to 0 or an empty stage timer value for the current stage is equal to or has exceeded at least one of an average access period and a location-based period. The comparison module 54 may compare a period in the access timing memory 68 with an empty stage timer value to generate the comparison signal CRN. The comparison signal may be HIGH when the empty stage timer value is equal to or has exceeded the average access period and/or the location-based period.

The PS module 30 proceeds to task 308 based on output of the gate control module 56. Task 308 is performed when the comparison signal CRN is HIGH.

The waiting performed at tasks 302 and 306, allows additional host commands to be received. This in turn allows a current stage slot to be partially or fully filled. The PS module 30 thus refrains from storing (i.e. waiting to store) stage commands and/or a stage command packet in the staging memory 32 while waiting for the complete signal and/or an empty stage time out signal.

At 308, the PS module 30 determines whether there are stage commands available for storing in the staging memory 32. Stage commands may be available when new host commands have been received from the host and stored in the host command buffer 29.

Task 310 is performed when there are stage commands to at least partially fill a stage slot. The PS module 30 may determine whether a next available flash array (e.g., flash array B of FIG. 5) is not to be stalled due to an at least partially filled stage slot (e.g., stage slot 2 of FIG. 5) in a pipeline. If the next available flash array is not expected to be stalled, then task 310-312 may be performed.

Task 314 may be performed when stage commands are not available for storage in the current stage slot. If the next available flash array is to be stalled due to an empty stage slot (e.g., stage slot 2 of FIG. 8) in the pipeline, then tasks 314-316 may be performed.

At 310, the average and/or location-based timer for the current stage is started. The average and/or location-based timer is used to measure the transfer time associated with a flash memory access of the current stage.

At 312, the PS module 30 stores a stage command and/or a stage command pack in a current stage slot of the staging memory 32. The stage command and/or the stage command pack is stored in the staging memory 32 based on the gate control signal GATE. Stage commands that are available are dropped (stored) into the current stage slot to maintain the current stage slot in an "as full as possible" state. Task 312 may be performed subsequent to task 310 or during the same period as task 310. The PS module 30 may return to task 300 subsequent to performing task 312.

At 314, the timer module 52 starts an empty stage timer for the current stage. The empty stage timer may be used to trigger filling of a next stage slot (e.g., stage slot 7) of the flash array (e.g., flash array B). This is shown in FIG. 8.

At 316, the PS module 30 leaves a stage slot empty and/or stores a dummy command in the current stage slot. The dummy command may indicate that there were not any stage commands to store in the current stage slot. If there is no stage commands to store, the PS module 30 does not store stage commands in the current stage (leaves the current stage slot empty) or may store a dummy stage command in the current stage slot. Tasks 314 and 316 may be performed during the same period. The PS module 30 may return to task 300 subsequent to performing task 316.

In the above-described method the empty stage monitoring module based on an empty stage timer value detects an empty stage of a flash array and triggers at least one of: an end of the empty stage, a start of an at least partially full stage of the one of the flash arrays, or a start of a second empty stage of the one of the flash arrays. The end of the empty stage, the start of an at least partially full state and the start of a second empty stage may not be triggered at the same time.

The above-described tasks 300-316 are meant to be illustrative examples; the tasks may be performed sequentially, synchronously, simultaneously, continuously, during overlapping time periods or in a different order depending upon the application.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A drive control module of a solid-state drive (SSD) comprising:
   a first module configured to receive host commands from one of a host command buffer and a drive interface of the SSD, convert the host commands to stage commands, and determine whether to store the stage commands in a stage slot of a staging memory or leave the stage slot empty;
   a second module configured to transfer data between a buffer and a flash memory of a flash memory module based on the stage commands, wherein the flash memory comprises flash arrays; and
   a third module configured to detect a first empty stage of one of the flash arrays and based on an empty stage timer value to trigger at least one of an end of the first empty stage, a start of an at least partially full stage of the one of the flash arrays, or a start of a second empty stage of the one of the flash arrays.

2. The drive control module of claim 1, wherein the first module selectively stores the stage commands in the stage slot of the staging memory based on a stage complete signal received from the flash memory module or generated by the second module.

3. The drive control module of claim 2, wherein the stage complete signal indicates completion of an access of a flash array.

4. The drive control module of claim 1, wherein the first module selectively stores the stage commands in the stage slot of the staging memory based on an empty stage time out signal.

5. The drive control module of claim 1, wherein the third module triggers storing of stage commands in the staging memory for the at least partially full stage when triggering the start of the at least partially full stage.

6. The drive control module of claim 1, further comprising the staging memory, wherein the staging memory comprises stage slots, each of the stage slots storing for a respective one of the flash arrays at least one of a stage command or a stage command pack.

7. The drive control module of claim 1, wherein the third module comprises:
   a first timer configured to determine at least one of an average stage period or a location-based period;
   a second timer configured to determine an empty stage period;
   a fourth module configured to compare the empty stage period to the at least one of an average stage period or the location-based period and to generate a comparison signal; and
   a fifth module configured to based on the comparison signal trigger the at least one of the end of the first empty stage, the start of the at least partially full stage, or the start of a second empty stage.

8. The drive control module of claim 1, wherein the third module comprises:
   a first timer configured to determine at least one of an average stage period or a location-based period;
   a second timer configured to count down from the at least one of the average stage period or the location-based period; and
   a fifth module configured to when an empty stage timer value of the second timer decrements to 0 trigger the at least one of the end of the first empty stage, the start of the at least partially full stage, or the start of the second empty stage.

9. The drive control module of claim 1, wherein:
   the first module stores stage commands in a stage slot of the one of the flash arrays; and
   the second module accesses buckets of the one of the flash arrays via respective channels assigned to the buckets according to the stage commands in the stage slot.

10. The drive control module of claim 9, wherein:
    the second module accesses a first one of the buckets during an access period; and
    the second module accesses a second one of the buckets during the access period.

11. The drive control module of claim 1, wherein:
    the first module stores stage commands in the staging memory based on the end of an empty stage trigger when an empty stage is detected; and
    the first module stores stage commands in the staging memory based on a complete signal when an empty stage is not detected.

12. The drive control module of claim 1, wherein the first module stores:
    stage commands for a first flash array in the first module during a first period;
    stage commands for M flash arrays in the first module during M periods, wherein the M periods start subsequent to a start of the first period and M is an integer greater than 1; and
    stage commands for the first flash array in the first module in an M+1 period based on the trigger, wherein the M+1 period starts subsequent to a start of the M periods and at the end of the first period.

13. The drive control module of claim 12, wherein:
    the first period ends prior to end of the M periods; and
    the M periods end prior to end of the M+1 period.

14. The drive control module of claim 1, wherein the third module is configured to detect the first empty stage of the one of the flash arrays and trigger the end of the first empty stage and trigger either the start of an at least partially full stage or the start of the second empty stage.

15. The drive control module of claim 1, wherein the third module based on the empty stage timer value and not based on the complete signal triggers the at least one of the end of the first empty stage, the start of the at least partially full stage, or the start of a second empty stage.

16. The drive control module of claim 1, wherein the third module when the empty stage timer value is equal to or exceeds at least one of an average stage period or a location-based period triggers the at least one of the end of the first empty stage, the start of the at least partially full stage, or the start of a second empty stage.

17. A system comprising:
    the buffer of claim 1;
    the drive control module of claim 1; and the flash memory module comprising the flash memory of claim 1.

18. The system of claim 17, further comprising the host with a host interface, wherein the host interface communicates with the drive interface, and the host interface and the drive interface are one of serial advanced technology attachment (SATA) interfaces and small computer system interfaces (SCSIs).

19. A method of operating a solid-state drive (SSD) comprising:

receiving host commands from one of a host command buffer and a drive interface of the SSD;

converting the host commands to stage commands;

determining whether to store the stage commands in a stage slot of a staging memory or leave the stage slot empty;

transferring data between a buffer and a flash memory of a flash memory module based on the stage commands, wherein the flash memory comprises flash arrays;

detecting a first empty stage of one of the flash arrays; and based on an empty stage timer value, triggering at least one of an end of the first empty stage, a start of an at least partially full stage of the one of the flash arrays, or a start of a second empty stage of the one of the flash arrays.

20. The method of claim 19, further comprising:

determining at least one of an average stage period or a location-based period;

determining an empty stage period;

generate a comparison signal based on a comparison between the empty stage period and the at least one of an average stage period or the location-based period; and based on the comparison signal triggering the at least one of the end of the first empty stage, the start of the at least partially full stage, or the start of a second empty stage.

\* \* \* \* \*